United States Patent [19]

Minotti

[11] 4,351,349

[45] Sep. 28, 1982

[54] PIPE REPAIR KIT APPARATUS AND METHOD

[76] Inventor: Peter L. Minotti, R.D. 1, Box 75, Easton, Pa. 18042

[21] Appl. No.: 205,199

[22] Filed: Nov. 10, 1980

[51] Int. Cl.³ .................... F16L 55/10; F16L 55/18; F16K 43/00
[52] U.S. Cl. .................................. 137/15; 137/318; 138/93; 138/97; 408/67; 408/205
[58] Field of Search .................. 137/15, 315, 318; 138/93, 94, 97; 285/197, 198, 199; 408/67, 205

[56] References Cited

U.S. PATENT DOCUMENTS

| | | | |
|---|---|---|---|
| 2,027,139 | 1/1936 | Abramson et al. | 408/205 |
| 2,272,734 | 2/1942 | Witt | 138/94 |
| 2,399,544 | 4/1946 | Danner | 138/93 |
| 2,763,282 | 9/1956 | Reedy et al. | 137/318 |
| 2,899,983 | 8/1959 | Farris | 137/318 |
| 3,040,779 | 6/1962 | Guier | 138/97 |
| 3,115,163 | 12/1963 | Van Epps et al. | 138/94 |
| 3,799,182 | 3/1974 | Long | 137/318 |
| 3,841,355 | 10/1974 | Laner | 138/93 |
| 4,127,141 | 11/1978 | Ledonne et al. | 137/318 |
| 4,155,373 | 5/1979 | DiGiovanni | 137/318 |
| 4,291,727 | 9/1981 | Yie et al. | 138/93 |

FOREIGN PATENT DOCUMENTS

1527267 10/1978 United Kingdom .............. 138/97

Primary Examiner—George L. Walton
Attorney, Agent, or Firm—Austin R. Miller

[57] ABSTRACT

Apparatus and methods facilitating isolation of a pipe segment for repair thereof include releasable reclosable means for gripping the pipe exterior, a first conduit extending through the releasable gripping means transverse to the pipe when the releasable gripping means is about the pipe with an end of the first conduit terminating proximate the pipe exterior, sealing means sealing between the first conduit and the pipe exterior surface, a second conduit communicating with the first conduit remote from the end of the first conduit which is closest to the pipe exterior, cutting means insertable through the first conduit for cutting an aperture in the pipe wall with the cutting means having a passageway therewithin extending axially from the cutting end to a position along the cutting means lateral surface for withdrawal of fluid from the cutting point, an inflatable bladder insertable into the pipe interior via the first conduit and serving to block the interior of the pipe when inflated and valve means for selectably opening and closing the first conduit. The invention provides means for isolating the pipe segment needing repair with minimal loss of fluid from the pipe requiring repair during the repair procedure.

16 Claims, 11 Drawing Figures

PIPE REPAIR KIT APPARATUS AND METHOD

BACKGROUND OF THE INVENTION

1. Field of the Invention

This invention relates to repair of pipes in which a segment requiring repair must be isolated from the remainder of the pipe.

2. Description of the Prior Art

Shutting off pipes to facilitate repair thereof is known; typical is the method and apparatus disclosed in U.S. Pat. No. 3,040,779. Also known are stoppers for closing off pipe sections, as disclosed in U.S. Pat. Nos. 1,946,138; 3,710,812 and 3,908,682. Pipe repair plugs and valves for tapping pipes are also known; see U.S. Pat. Nos. 2,399,544 and 3,973,584.

Of interest are U.S. Pat. Nos. 4,127,141 and 4,155,373. The '141 patent discloses a method and apparatus for sealing the opening in the side wall of a fluid carrying pipe during replacement of a service "T" associated with the pipe. Apparatus disclosed in the '373 patent facilitates closure of a pipe section.

While the apparatus disclosed in the prior art presumably functions successfully for its intended use, there is need for highly portable apparatus which can be easily transported to where a pipe has failed, attached to the pipe with minimal tools and used to shut-off the pipe segment requiring repair. Furthermore, there is need for lightweight portable apparatus which facilitates shut-off of a pipe segment without release of fluid within the pipe to the atmosphere. This is highly desirable especially when repairing pipes through which combustible gas flows.

SUMMARY OF THE INVENTION

This invention provides methods and apparatus facilitating pipe repair. The apparatus is portable, inexpensive, can be provided in kit form so that portions of the apparatus are reusable and requires a minimum in the way of power tools, heavy equipment and like to operate. The invention has wide application as will be readily discerned from study of the following specification and the attached drawings.

The invention includes releasable reclosable means for circumferentially gripping an exterior surface of a pipe where the releasable gripping means may include upper and lower portions connected by hinge means and having fastener means for urging the upper and lower gripping means portions together about the pipe. An aperture is provided through gripping means transverse to the pipe and a first conduit extends outwardly from the gripping means at a position axially aligned with the aperture with the first conduit having an end terminating proximate the aperture. A seal is desirably provided to seal the pipe exterior surface and the first conduit at the aperture so fluid leakage is minimized when the pipe wall is cut at the aperture. A second conduit communicates with the first conduit remote from the end of the first conduit proximate the aperture. A valve is provided in the first conduit for selectably closing the first conduit. When open, the valve provides a passageway through the first conduit which is at least as large as the first conduit cylindrical interior.

Axially elongated cutting means are slip fitably insertable through the first conduit and allow cutting another aperture in the wall of the pipe. The cutting means includes an axial channel or passageway extending from the cutting end along the cutting means about a length equal to distance along the first conduit from juncture thereof with the pipe exterior to where the first and second conduits communicate with one another. The channel or passageway has an entrance opening at the end opposite from the cutting end of the cutting means with the entrance opening being exposed at a lateral surface of the cutting means. An inflatable bladder is insertable into the pipe interior via the first conduit through the aperture in the pipe wall cut by the cutting means and when inflated serves to block the interior of the pipe being repaired.

The invention includes securing pairs of releasable reclosable gripping means about the pipe section requiring repair, one means of each pair on either side of the pipe repair section, with the respective gripping means of each pair being serially disposed in the same manner on either side of the repair section as one proceeds axially along the pipe away from the repair section. Holes are bored in the pipe at respective first gripping means and shafts are inserted across the pipe interior through the respective first bored holes. Holes are bored in the pipe at the respective second gripping means; these holes are connected with a bypass conduit for flow of fluid around the pipe portion requiring repair. Holes are bored in the pipe at respective third gripping means; inflatable bladders are inserted in the pipe interior through the third bored holes and are inflated until the bladders contact the shafts previously positioned across the pipe interior and occupy the cross sectional area of the pipe, blocking fluid flow through the pipe portion requiring repair and causing flow of fluid through the bypass conduit.

DESCRIPTION OF PREFERRED EMBODIMENTS

Figures 1, 4, 7, 9, 11:
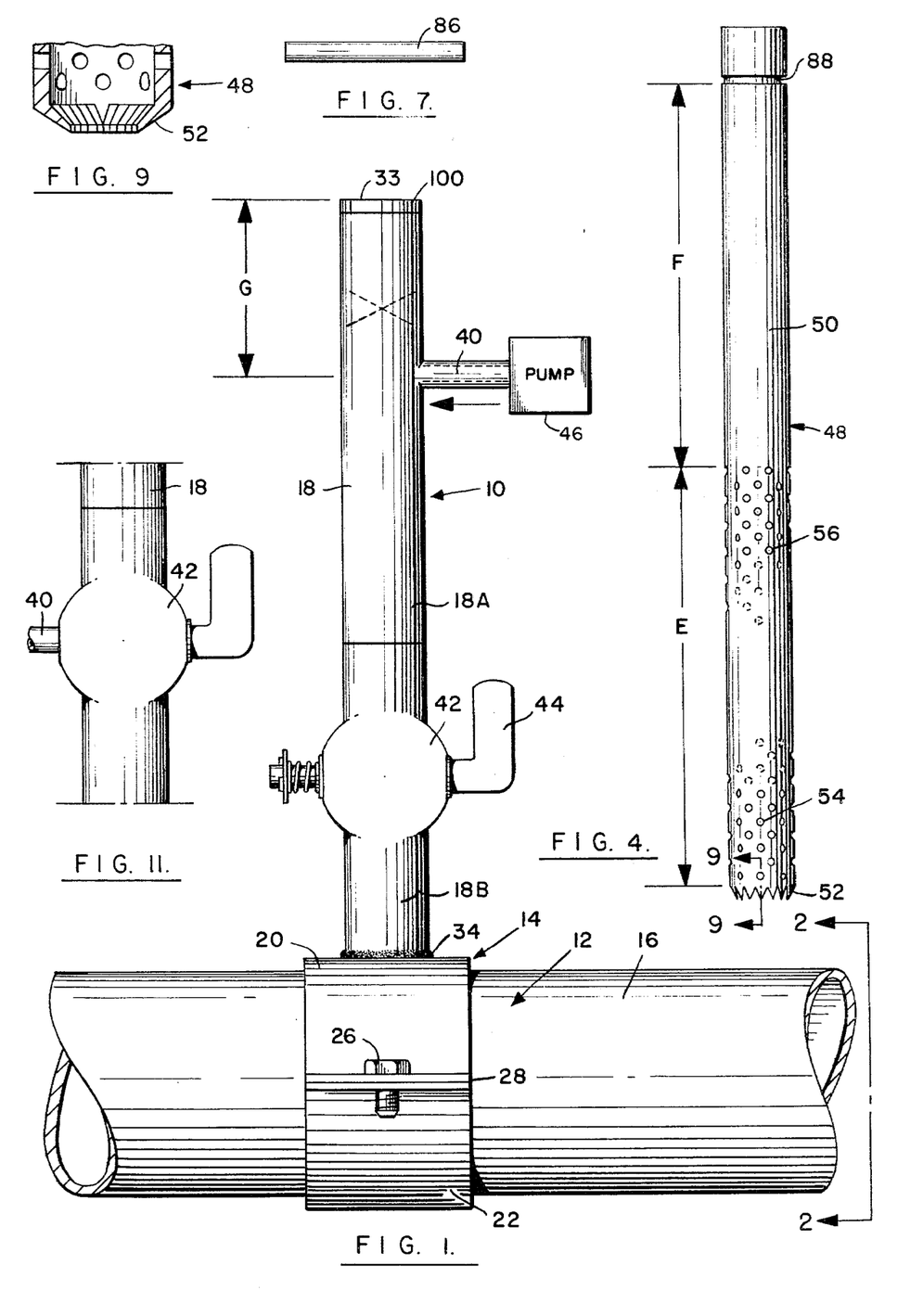
FIG. 1 is a side elevation of a portion of the pipe maintenance kit apparatus positioned about a pipe.
FIG. 4 is a side elevation of a cutting means embodying a portion of the invention.
FIG. 7 is a side view of a shaft embodying a portion of the invention.
FIG. 9 is a broken section taken at 9—9 in FIG. 4.
FIG. 11 is a broken side view of an alternate embodiment of a valve and two conduits embodying part of the invention.

Referring to the drawings, particularly FIG. 1, there is shown a portion of pipe maintenance apparatus designated generally 10 and secured about a pipe 12 requiring repair by a releasable reclosable gripping means 14 which circumferentially grip an exterior surface 16 of pipe 12. The portion 10 of the apparatus includes a first conduit 18 which extends transversely to pipe 12 when releasable gripping means 14 are engaged about the pipe.

Figures 2, 3:
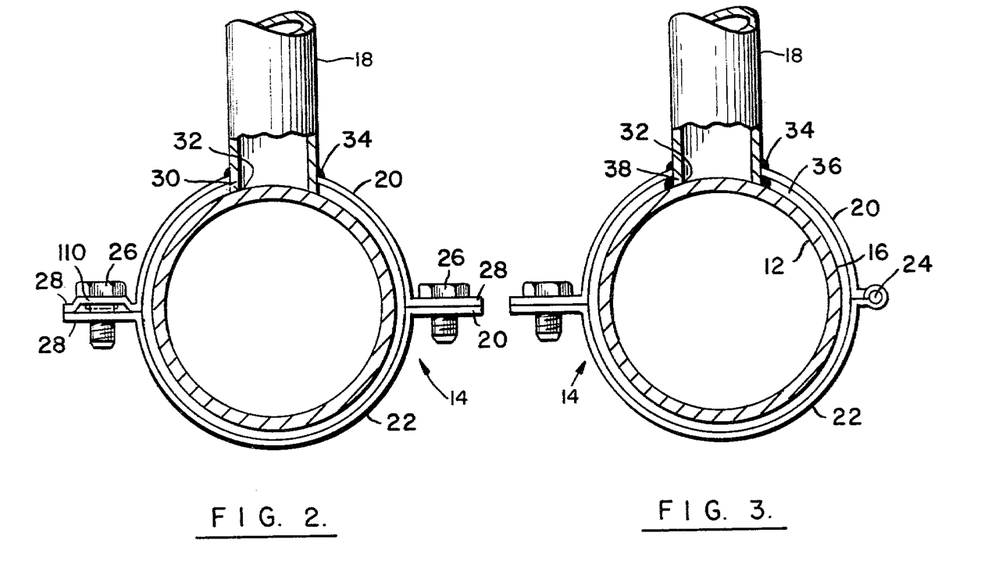
FIG. 2 is a broken section taken at arrows 2—2 of FIG. 1.
FIG. 3 is a broken section taken at arrows 2—2 in FIG. 1, showing a second embodiment of the invention.

Gripping means 14 may include upper gripping means 20 in the form of a curved plate and lower gripping means 22, similarly in the form of a curved plate, with upper and lower gripping means 20, 22 connected together via hinge means 24. Fastener means 26, denoted as a machine screw in FIGS. 2 and 3, may be provided for urging upper and lower gripping means 20, 22 together about the surface of pipe 12 thereby urging upper and lower gripping means 20, 22 against the pipe exterior surface 16. Note in FIGS. 2 and 3 that the hinge means 24 may be omitted and two fasteners, one on either side of pipe 12, may be used to secure upper and lower gripping means 20, 22 together. Lateral tabs 28 may extend from upper and lower gripping means 20, 22 for receipt of fastener means 26. A pin 110, as illustrated in FIG. 2, may be provided to retain fastener 26 in the ear 28 of upper gripping means 20 even when the fastener is not engaged with lower gripping means 22.

An aperture 30 is formed in upper gripping means 20 and positioned transverse to the pipe exterior surface 16 when gripping means 14 is secured about pipe 12. First conduit 18 is received within aperture 30 and positioned so that first end 32 of conduit 18 is at least proximate and preferably in contact with exterior surface 16 of pipe 12 when gripping means 14 is positioned about the pipe. First conduit 18 may be secured to upper gripping means 20 via welds 34.

Upper gripping means 20 has a concave interior surface 36 contoured to fit complementally about convex curved exterior surface 16 of pipe 12. Close fitting of surfaces 36 and 16 allow sealing means 38, which may be a gasket or a silicone seal which solidifies from a liquid, to effect a fluid-tight closure of first end 32 of conduit 18 and pipe 12. When gripping means 14 are installed about pipe 12 and upper and lower gripping means 20, 22 are urged together by action of fastener 26, compression of sealing means 38 between surfaces 36 and 16 results, thereby effecting the fluid-tight seal at juncture of conduit 18 first end 32 and pipe 12. Sealing means 38 extend circumferentially entirely about first end 32 of conduit 18.

A second conduit 40 communicates with first conduit 18 preferably at a position remote from first end 32 and is preferably disposed transversely to the axis of first conduit 18. A valve 42 is located within first conduit 18 for selectably closing first conduit 18. Valve 42 may be of the conventional barrel type and, in any event, when open provides a passageway through first conduit 18 which is of at least the size of the cylindrical interior of conduit 18. A hand actuator 44 may be used to control valve 42 or a slotted member, rotatable using a screw driver, may be used to actuate the valve. The slotted member is preferable when the apparatus is used in the home, where children may reach it, or where pipe 12 carries a hazardous or corrosive liquid. Optionally, valve 42 may be positioned above second conduit 40, as shown by the "X" in FIG. 1, or may have second conduit 40 positioned to draw off fluid from and in communication with the valve, as shown in FIG. 11.

Optionally, pump means 46 may be provided connected to second conduit 40, to draw subatmospheric pressure from first conduit 18 through second conduit 40. Preferably pump 46 can be connected to and disconnected from second conduit 40 at the option of the user. Second conduit 40 is preferably equipped with tapered internal threads, commonly referred to as pipe threads.

A cutting means generally designated 48 for cutting a hole in pipe 12, reaching pipe 12 via travel through conduit 18, is illustrated in FIG. 4. Cutting means 48 may comprise a hollow cylindrical member 50 having cutting teeth 52 peripherally disposed about first end 54 thereof with cutting teeth 52 being radially inwardly inclined towards the axis of cylindrical member 50. Inward inclination of teeth 52 serves to retain the circular chip portion of the wall of pipe 12 removed when member 50 is utilized to bore a hole in pipe 12. Inward inclination of teeth 52 is best shown in FIG. 9. Pressure of fluid within pipe 12 urges the cut circular chip into the interior of hollow member 50. This fluid pressure also prevents small chips resulting from the cutting process from entering the pipe 12. Cutting means 48 may further include a plurality of orifices 56 in the wall of cylindrical member 50 which provide communication between the cylindrical exterior of member 50 and the hollow interior thereof.

Figure 5:
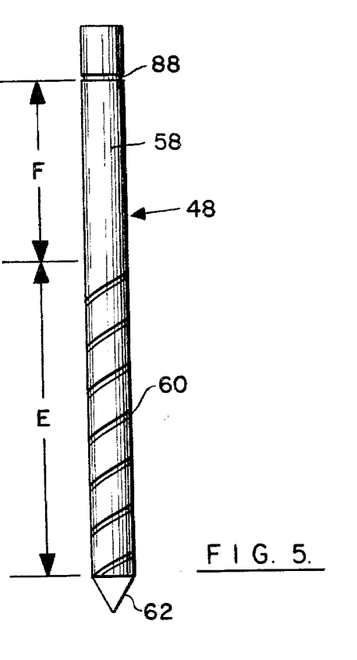
FIG. 5 is a side elevation of a second embodiment of a cutting means embodying a portion of the invention.

Alternately a twist drill 58, as illustrated in FIG. 5, may be utilized as a cutting means 48. Drill 58 includes a helical flute 60 which provides for fluid communication between the cutting tip 62 of drill 58 and the cylindrical exterior surface of drill 58 remote from tip 62.

Both cutting means 48, namely cylindrical member 50 and twist drill 58, are sized for close fitting complemental slidable entry into and passage through the cylindrical interior of conduit 18.

An inflatable bladder 64 is provided for insertion into the interior of pipe 12 after a hole has been drilled through the wall of pipe 12 by either cutting means 48. Bladder 64 has a hollow interior 66 which allows the bladder to be internally pressurized once bladder end portion 68 has been inserted into the interior of pipe 12. Bladder end portion 68 extends axially from bladder end tip 70 to a terminus where end portion 68 joins a first intermediate portion 72 of bladder 66. First intermediate portion 72 has a wall of second thickness greater than the first thickness walls of end portion 68. This difference in thickness manifests itself as a shouler 74 at juncture of end portion 68 and first intermediate portion 72. Bladder 66 also includes a second intermediate portion 76 having wall of third wall thickness greater than the second wall thickness associated with first intermediate portion 72. This difference in wall thickness between the third and second wall thicknesses manifests itself as a shoulder 78 at juncture of first and second intermediate portions 72, 76 of bladder 66. Bladder end portion 68 is preferably externally cylindrically configured prior to internal pressurization of bladder 66 via application of pressurized gas or liquid to the hollow interior of the bladder. When the bladder is internally pressurized, bladder end portion 68 expands as shown by the dotted line in FIG. 6.

Figures 6, 10:
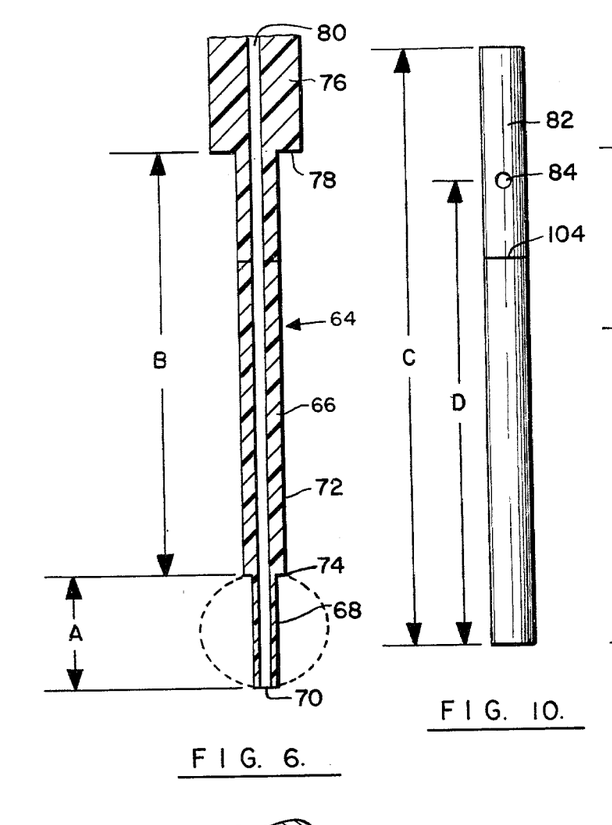
FIG. 6 is a side elevation in section of an inflatable bladder embodying a portion of the invention.
FIG. 10 is a side view of a second shaft embodying a portion of the invention.

Bladder end portion 68 preferably has outer diameter at most equal to the outer diameter of cutting means 48. This provides for easy fit of bladder end portion 68 into the interior of pipe 12 once a hole has been bored in the wall of the pipe. The axial length of bladder end portion 68, denoted A in FIG. 6, preferably is about the same as the inner diameter of pipe 12. Axial length of first intermediate portion 72, denoted B in FIG. 6, is chosen to be the same as the length of conduit 18. Outer diameter of first intermediate portion 72 is selected to be at most equal to the inner diameter of conduit 18, to facilitate slideable fit of the bladder into conduit 18. Outer diameter of bladder second intermediate portion 76 is selected to be greater than the inner diameter of conduit 18.

Selection of the outer diameter of the three portions 68, 72 and 76 of bladder 66 creates shoulders 74 and 78 which effectively position bladder 66 within conduit 18. As the user inserts the bladder, when shoulder 78 contacts the end of conduit 18 remote from pipe 12, the user knows that the bladder is properly positioned with bladder end portion 68 within pipe 12. Likewise shoulder 74 assures that only end portion 68 of bladder 66 enters pipe 12.

Also provided is a preferably cylindrically externally configured shaft 82, which includes a transverse aperture 84 therein, illustrated in FIG. 10. Shaft 82 has length, denoted C in FIG. 10, of at least the length of conduit 18 plus the outer diameter of pipe 12. Preferably shaft 82 is slightly longer than this so that a portion of shaft 82 protrudes from the second end 33 of conduit 18 when shaft 82 is positioned within conduit 18 and extends into the exterior of pipe 12. Aperture 84 is located a distance D from an end of shaft 82; distance D equals the sum of the outer diameter of pipe 12 plus the distance along conduit 18 from first end 32 to second conduit 40. Shaft 82 preferably has outer diameter sized for close fitting complemental slideable insertion into conduit 18 and into the interior of pipe 12 once a hole has been cut in the wall of pipe 12 by either of cutting means 48. A second shaft 86, illustrated in FIG. 7, is insertable into aperture 84 through second conduit 40 and retains first shaft 82 in position in conduit 18.

Both cutting means 48 include passageways for fluid communication between respective cutting ends 52 and 62 and a point on lateral surface of cutting means 48 axially removed from respective cutting ends 52, 62. In cutting means illustrated in FIG. 4 the passageway is provided by the hollow cylindrical interior of cylindrical member 50 with termination of the passageway being defined by the one of orifices 56 which is axially most remote from cutting teeth 52. In cutting means 48 illustrated in FIG. 5 the passageway is in the form of a channel defined by a flute 60 of twist drill 58.

Both cutting means 48 include visually discernible indicia 88 located on a lateral surface of cutting means 48 remote from respective cutting ends 52, 62.

In the preferred embodiment, in each of cutting means 48 the passageways for fluid communication between the cutting ends and the lateral surfaces of the cutting means extend axially along cutting means 48 a distance E in FIGS. 4 and 5. Distance E is at least as long as the distance defined by the sum of outer diameter of pipe 12 plus distance between second conduit 40 and first end 32 of conduit 18 when the second conduit is in the preferred relationship with valve 42, i.e. with valve 42 positioned between the second conduit 40 and pipe 12. This assures fluid communication between second conduit 40 and the point at which the wall of pipe 12 is cut during the cutting operation. When the second conduit 40 is in some other relationship with valve 42, the passageways in cutting means 48 need only extend axially a sufficient distance to provide fluid communication between the interior of pipe 12 and second conduit 40 when the cutting means has cut the aperture in the wall of pipe 12 and bottomed against the facing interior surface of pipe 12.

Visible indicia 88 are axially removed from termination of the fluid communication passageway a distance shown as F in FIGS. 4 and 5. Distance F is selected to be less than distance G which is the distance between the point of communication between first and second conduits 18 and 40 and second end 33 of first conduit 18; this is shown in FIG. 1. So-configuring cutting means 48, first conduit 18 and second conduit 40 allows the cutting operation to proceed without escape of fluid within pipe 12 to the environment if the optional vacuum pump 46 is provided. Specifically, pump 46 may be connected to second conduit 40 and cutting means 48 then inserted into second end 33 of first conduit 18. Pump 46 is actuated and cutting begins; valve 42 is, of course, open. As cutting continues, pump 46 draws off any fluid escaping from valve 12; subatmospheric pressure is created at the cutting tip of cutting means 48 as subatmospheric pressure is drawn through orifices 56 and the cylindrical interior of cutting member 50 or via drill flute 60. Cutting continues until the desired hole is bored in pipe 12 whereupon cutting means 48 can be withdrawn partially through conduit 18. Pump 46 continues to draw subatmospheric pressure and cutting means 48 is withdrawn until indicia 88 are seen at second end 33 of first conduit 18. The close complemental fitting of the cylindrical exterior portion of cutting means 48, remote from the cutting end of the respective cutting members, with the cylindrical interior of conduit 18 above second conduit 40, prevents escape of fluid to the atmosphere. Valve 42 can then be closed and pump 46 shut off once a reasonable vacuum has been drawn in second conduit 40 indicating that no fluid that has escaped from pipe 12 remains within first conduit 18. Once this occurs, cutting means 48 may be removed from first conduit 18.

Figure 8:
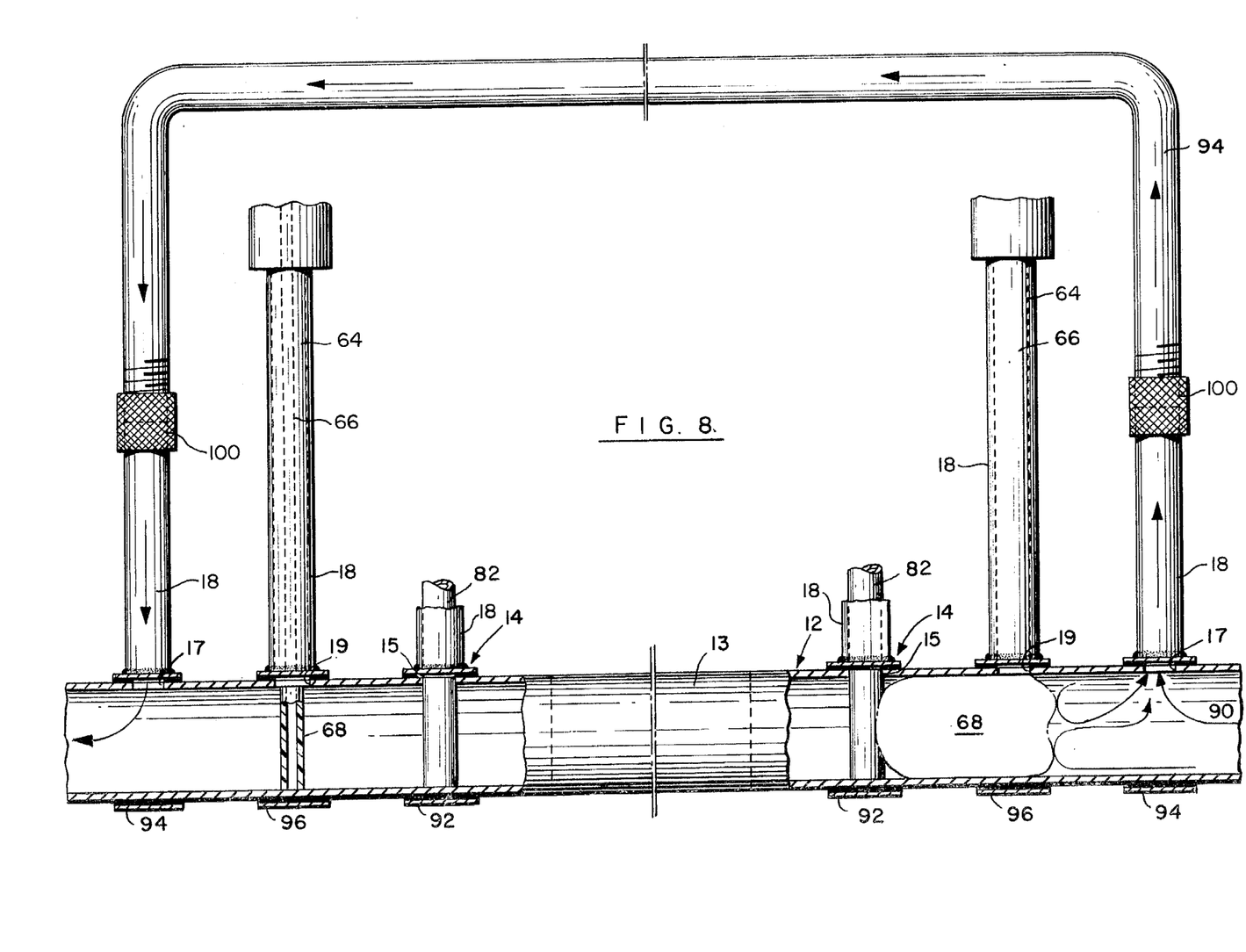
FIG. 8 is a side view of a pipe to be repaired having apparatus embodying a portion of the invention secured thereabout.

An aspect of the invention lies in isolating a portion of a pipe requiring repair with such isolation being performed with minimal loss of the fluid material flowing within the pipe requiring repair and without escape to the environment of such fluid. Referring to FIG. 8, a portion of a pipe 12 requiring repair is denoted 13 and appears between dotted lines. Fluid 90 is within pipe 12. The method begins with an operator securing a pair of first releasable reclosable gripping means 14 about the pipe exterior at positions respectively upstream and downstream of repair portion 13. These first positions are denoted 92 in FIG. 8. First holes 15 are bored in pipe 12 at the respective first gripping means. Shafts 82 are then inserted into pipe 12 through first holes 15 via first conduits 18 and may be secured in place with second shafts 86 inserted into apertures 84 in shafts 82 with the second shafts 86 passing through second conduits 40. A second pair of releasable reclosable gripping means 14 are then secured about the exterior of pipe 12 at second positions respectively further upstream and downstream of first positions 92; these second positions are denoted 94 in FIG. 8. Second holes 17 are bored in pipe 12 at the respective second pair of gripping means. The respective second holes 17 are then connected with a bypass conduit 94 which may be fitted about the second end 33 of first conduit 18 or fitted to an end of second conduit 40 and which provides for flow of fluid 90 around pipe portion 13 requiring repair. A pair of third releasable reclosable gripping means 14 are secured about pipe 12 at third positions denoted 96 which are respectively upstream and downstream of repair portion 13; each position 96 is between a respective first and second gripping means respectively upstream and downstream of repair portion 13. Third holes 19 are bored in pipe 12 at respective third gripping means. Inflatable bladders 66 are then inserted into the pipe interior through third holes 19 and are inflated until bladder end portions 68 contact respective proximate shafts 84 and occupy the entire cross sectional area of the pipe interior thereby blocking flow of fluid through the pipe portion requiring repair and causing flow of fluid through bypass conduit 94.

In FIG. 8 only the bladder upstream of repair portion 13 has been illustrated inflated.

The boring steps are preferably performed with either illustrated cutting means 48.

Subatmospheric pressure may be drawn through second passageway 40 and thereby drawn at the cutting end 52 or 62 of cutting means 48 with communication being provided between second conduit 40 and cutting edge 52 or 62 via either orifices 56 and hollow interior of cylindrical member 50 or drill flute 60. In performing the boring steps, by drawing subatmospheric pressure through second conduit 40 while boring is proceeding and then by withdrawing the cutting means only to a position where indicia 88 appear at second end 33 of a first conduit 18, the close fitting of the cylindrical portion of the cutting means (between indicia 88 and either orifices 56 or flute 60) with the cylindrical interior of the portion of a first conduit 18 between second conduit 40 and second end 33 effectively seals the conduit 18 and prevents escape of the fluid. In such case, fluid is drawn off via pump 46 and, after the boring operation is completed, valve 42 can be closed to prevent escape of fluid until a bypass conduit or the like is connected to the first conduit 18.

The apparatus of the invention is preferably provided in kit form with a variety of sizes of bladders, to fit different diameter pipes requiring repair.

It is desirable that a conventional twist-compression fitting 100 be provided at end 33 of conduit 18 remote from pipe 12. Fitting 100 may be twisted to effect a fluid-tight seal about a cylindrical member inserted into end 33 of conduit 18. For instance, when a cutting means 48 is inserted into conduit 18 sufficiently far so that the smooth cylindrically configured exterior portion of the cutting means remote from the cutting end is within fitting 100, the fitting is twisted to tighten about the cutting means so that no fluid escapes from second end 33 of conduit 18. After the cutting operation has been completed, fitting 100 can be further tightened around the cutting means 48 to retain the cutting means in place while work on the pipe proceeds.

If desired, conduits 18 may be manufactured in two segments, indicated in 18A and 18B in FIG. 1, which may be threaded into one another just above valve 42, with valve 42 residing within the segment which is affixed to gripping means 14.

The kit apparatus of the invention may contain, in addition to a variety of sizes of bladders, a variety of sizes of gripping means 14, conduits 18, cutting means 48 and shafts 82 and 86.

A major advantage of the invention is the feature which allows isolation of a pipe segment requiring repair, thereby obviating the need for shutting down the entire pipe system during repair of the damaged segment. This is of particular value when repairing a home heating system during the winter time.

In general, the sequence of operation for using a single gripping means 14-conduit 18 combination in connection with repair of a pipe segment is first to attach gripping means 20 and 22 to pipe 12 requiring repair. Valve 42 is closed. If needed, second portion 18A of conduit 18 is threaded into portion 18B above valve 42. Fitting 100 at second end 33 of conduit 18 is loosened and cutting means 48 is inserted into conduit 18 until the cutting means tip contacts the closed interior of barrel valve 42. Fitting 100 is then tigthened about the cutting means shaft sufficiently to create a seal about the cutting means shaft but not so much as to seize the cutting means shaft; such tightening precludes fluid leakage out of first conduit 18.

If contamination of the contents of pipe 12 by chips formed during cutting of pipe 12 is to be avoided, pump 46 is connected to second conduit 40 and actuated to draw a vacuum through second conduit 40.

Next, cutting means 48 cuts an aperture in pipe 12. Preferably, a twist drill 58 is used if pipe 12 is a hard material such as steel while cylindrical cutting means 50 is utilized if pipe 12 is a soft material such as copper. If cylindrical cutter 50 is used, the chip from the pipe wall will be retained within the cutter interior and, when cutter 50 is removed, the chip may be retrieved. Once the cut is completed cutting means 48 is withdrawn only until indicia 88 at the upper portion of cutting means 48 are observed at second end 33 of conduit 18.

If pump 46 is utilized, pump 46 is halted. Valve 42 is closed, blocking flow out of pipe 12. Cutting means 48 is removed from conduit 18 and the desired member, such as bladder 66 or shaft 82, may be inserted into conduit 18. The desired member is inserted until it bottoms against valve 42. Fitting 100 is tightened sufficiently to prevent fluid leakage about the member but not so tight as to seize the member. Valve 42 is opened and the desired member, either bladder 66 or shaft 82, may be further inserted until the member bottoms against the inner wall of pipe 12.

If shaft 82 is utilized, the shaft may be locked in place by inserting second shaft 86 into orifice 84 via second conduit 40. If bladder 66 is being utilized, bladder 66 may be inflated using either gas or liquid; inflation secures bladder 66 in place.

The operator then proceeds to repair the pipe segment, boring other holes in the pipe segment for bladders, shafts or bypass conduits as illustrated with reference to FIG. 8. In each case, substantially the procedure outlined hereinabove is followed for boring the hole. Once the repair is completed the respective bladders and shafts are withdrawn until visual indicia 88, 104 respectively appear at second end 33 of conduit 18. These indicia indicate that the respective members have been withdrawn sufficiently so that valve 42 can be closed to prevent escape of fluid from within pipe 12. Finally, bladder 66 or shaft 82 and associated equipment are removed.

It is desirable that all structure insertable through conduit 18 into the interior of pipe 12 bear indicia indicating between valve 42 and second end 33 of conduit 18. This permits the operator to avoid escape of fluid from pipe 12 via conduit 18 by, in each case, only moving the bladder, shaft, etc. within conduit 18 until these indicia appear at second end 33. Valve 42 may then be closed, preventing escape of fluid from pipe 12, while the member retained within the upper portion of conduit 18 seals conduit 18 and prevents escape of fluid therefrom until valve 42 is closed.

Either liquid or gas can be used to inflate bladder 66 once the bladder is positioned within pipe 12. Use of liquid to inflate the bladder provides greater mass within the inflatable bladder end portion 68 and hence gives greater resistance to any flow of fluid around the bladder within pipe 12.

Different sizes of gripping means 20, 22 may be provided in a single apparatus so that one kit can be fitted about a variety of sizes of pipe 12. Alternatively, a single gripping means 20 can be configured to fit a range of sizes of pipe 12.

If desired a pin, illustrated as 110 in FIG. 2, may be provided passing radially through the shaft of fastener 26; pin 110 prevents fastener 26 from dropping out of ear 28 of gripping means 20 when fastener 26 is not engaged with a second ear of gripping means 22. This is helpful when using the pipe repair apparatus in close quarters.

The assembly of conduit 18 and valve 42, once secured about pipe 12, is reusable but not removable without loss of fluid from pipe 12. Specifically, once valve 42 and conduit 18 have been installed, the valve-conduit combination can be used to define a new take-off line for diverting a portion of fluid flowing within pipe 12.

Bladder 66 and cutting means 48 are, of course, reusable.

The invention is useful with pipes 12 which carry gases or liquids.

As illustrated in FIG. 11, second conduit 40 can communicate with first conduit 18 laterally through the side of valve 42. In such case valve 42 can be a conventional barrel valve bored and fitted with second conduit 40 at the side thereof.

It is desirable that second conduit 42 be internally threaded with tapered threads conventionally referred to as pipe threads. Initially conduit 42 is plugged with a threaded plug. When it is desired to utilize vacuum pump 46, the threaded plug is removed from second conduit 40 and the vacuum pump threaded thereinto and actuated. It is also desirable that second shaft 86 be externally threaded with tapered threads to threadly engage the threaded tapered interior of second conduit 40.

While it is envisioned that the apparatus may be offered for sale in kit form, containing a variety of sizes and plural numbers of the various elements described herein, the invention is not to be construed to be limited to such kit apparatus.

I claim:

1. Pipe maintenance kit apparatus comprising:
   a. first and second pluralities of identical releasable reclosable means for circumferentially gripping an exterior surface of a pipe;
   b. each of said releasable gripping means including a first conduit therethrough extending away from said pipe when said gripping means is engaged about said pipe, an end of said first conduit terminating proximate said pipe exterior surface when said releasable gripping means is engaged about said pipe;
   wherein all of said first conduit-gripping means combinations are identical;
   c. sealing means between each of said gripping means and said pipe exterior, disposed about said first conduit associated with the respective gripping means at the conduit end proximate said pipe exterior, for fluid tightly sealing said respective first conduits against said pipe exterior;
   d. each of said first conduits having respective second conduits communicating therewith remote the ends of said first conduits proximate said pipe exterior;
   wherein all of said gripping means-first conduit-second conduit combinations are identical;
   e. axially elongated cutting means, slip fitably insertable through any of said first conduits, for cutting apertures in said pipe, said cutting means having a passageway therewithin extending axially from a cutting end thereof about the distance along said first conduit from said first conduit-pipe exterior juncture to where said first and second conduits communicate one with another, said passageway having an entrance opening at the end thereof opposite said cutting end, said passageway entrance opening being at a lateral surface of said cutting means;
   f. each of said first conduits including valve means therein for selectable opening and closing said first conduit;
   g. a pair of inflatable bladder means each being insertable into said pipe interior in the absence of said cutting means and through said valve means disposed within respective first conduits via said respective first conduits through one of said apertures for blocking the interior of said pipe when inflated; and
   h. a pair of shafts, each being insertable into said pipe interior in the absence of said cutting means and through said valve means via respective first conduits through one of said apertures, for limiting expansion of said respective bladder means in the axial direction within said pipe;
   wherein first, second and third pairs of gripping means-first conduit-second conduit combinations, one member of each pair being selected from each of said first and second pluralities, are positionable on said pipe in serial symmetric disposition with respect to a segment of said pipe requiring repair, said shafts residing within said pipe interior via passage through respective first conduits of a most inboard, with respect to said pipe repair segment, pair of said gripping means, said bladders, residing within said pipe interior via passage through said respective first conduits of an intermediate, with respect to said pipe repair segment, pair of gripping means and said first conduits of the most outboard pair of gripping means being connected with a bypass conduit to faciliate flow of fluid otherwise carried by said pipe through said bypass conduit around said pipe segment requiring repair.

2. Apparatus of claim 1 further comprising pump means for drawing subatmospheric pressure through said second conduit from said first conduit, even when said cutting means is within said first conduit, said subatmospheric pressure being drawn through the passageway of said cutting means from said cutting end to juncture of said cutting means passageway with said second conduit.

3. Apparatus of claim 1 wherein said cutting means is a twist drill and said passageway is defined by a flute of said twist drill.

4. Apparatus of claim 3 wherein said first conduit has a cylindrically configured interior.

5. Apparatus of claim 1 wherein said cutting means comprises a hollow cylindrical member having cutting teeth peripherally disposed about one end thereof, said teeth being radially inwardly inclined towards the axis of said cylindrical member.

6. Apparatus of claim 1 wherein when said valve is open said first conduit including said valve has a cylindrically configured interior bore.

7. Apparatus of claim 1 further comprising means insertable into said first conduit through said second conduit for securing said shaft means in position within said pipe interior.

8. Apparatus of claim 1 wherein said valve means is in said first conduit between said second conduit and the end of said first conduit which is proximate said pipe.

9. Apparatus of claim 1 wherein said valve means is in said first conduit outboard of said second conduit with respect to said end of said first conduit which is proximate said pipe.

10. Apparatus of claim 8 or 9 wherein said passageway extends axially along said cutting means a first distance, wherein said cutting means has a cylindrical externally configured portion extending a second axial distance oppositely from said passageway entrance, wherein said first conduit has a cylindrically configured interior sized for complemental slip fit receipt of said cylindrical externally configured portion of said cutting means.

11. Apparatus of claim 10 wherein said first conduit extends outwardly from said pipe from the point of communication with said second conduit a distance in excess of said first axial distance.

12. Apparatus of claim 10 wherein said bladder includes:
   (1) a cylindrically configured axially elongated hollow end portion of length about equal to the inner diameter of said pipe and at most equal to outer diameter of said cutting means at said cutting end;
   (2) a first cylindrically configured axially elongated hollow intermediate portion of length about equal to the axial length of said first conduit, having outer diameter at most equal to inner diameter of said first conduit, extending from said end portion; and
   (3) a second cylindrically configured axially elongated hollow intermediate portion having outer diameter greater than inner diameter of said first conduit, extending from said first intermediate portion at an end thereof remote said end portion;
wherein hollow interiors of said end and first and second intermediate portions are in communication one with another.

13. Apparatus for pipe maintenance comprising:
   (a) releasable reclosable means for circumferentially gripping an exterior surface portion of said pipe, including:
      (i) upper gripping means having a concave surface portion contoured for complemental fitting about a convex exterior surface of said pipe, having an aperture therethrough transverse to said pipe exterior surface when said gripping means is engaged about said pipe exterior;
      (ii) lower gripping means releasably connected to said upper gripping means, for retaining said upper gripping means against said pipe exterior;
      (iii) hinge means for connecting said upper and lower gripping means; and
      (iv) fastener means for urging said upper and lower gripping means together about said pipe thereby urging said upper and lower gripping means against said pipe exterior surface;
   (b) a first conduit extending outwardly from said upper gripping means, axially aligned with and terminating proximate said aperture, having a cylindrical interior, said first conduit extending radially outwardly from said pipe when said releasable reclosable gripping means is secured about said pipe;
   (c) sealing means for sealing said pipe exterior surface and the wall of said first conduit proximate the end of said first conduit terminating proximate said aperture when said upper and lower gripping means are urged against said pipe exterior surface;
   (d) a second conduit communicating with said first conduit remote from said end of first conduit proximate said aperture.
   (e) valve means in said first conduit for selectably closing said first conduit, said valve means when open providing a passageway through said first conduit of at least the size of said first conduit cylindrical interior;
   (f) an inflatable bladder insertable into said pipe interior through said aperture via said first conduit in the absence of cutting means within said first conduit, and passing through said valve means in said first conduit, having an axially extending closed end portion of first wall thickness and outer diameter at most equal to diameter of said aperture, having an axially extending first intermediate portion of second wall thickness having outer diameter of said first conduit, having an axially extending second intermediate portion of third wall thickness greater than said second wall thickness, said third wall thickness defining a shoulder relative to said portion of second wall thickness, said portion of third wall thickness having outer diameter greater than inner diameter of said first conduit, said portion of first wall thickness extending axially from the end of said bladder a distance about equal to inner diameter of said pipe, said portion of second wall thickness extending axially from said portion of first wall thickness a distance at least equal to axial length of said first conduit;
   (g) cylindrical cutting means for cutting a hole through said pipe wall at said aperture, slidably insertable through said first conduit to contact said pipe wall in the absence of said inflatable bladder within said first conduit, said cutting means including a passageway extending axially from a cutting end of said cutting means a distance at least equal to axial distance along said first conduit from said conduit end proximate said pipe to said second conduit, said passageway terminus remote said cutting end defined by an orifice in the lateral wall of said cylindrical cutting means said passageway permitting flow of fluid from said cutting end to said second conduit at juncture of said orifice in said cutting means wall and said second conduit when said cutting means is within said first conduit and said cutting end is contacting said pipe wall; and
   (h) said cutting means including visually discernable indicia thereon positioned further from said cutting end than terminus of said passageway remote said cutting end, said indicia being separated from said terminus by a distance along said cylindrical cutting means less than distance between the point of communication of said first and second conduits and an end of said first conduit remote said pipe.

14. A method for isolating a portion of a pipe requiring repair, comprising the steps of:
   (a) securing a pair of first releasable reclosable gripping means about said pipe exterior at positions respectively upstream and downstream of said repair portion;

(b) boring first holes in said pipe at said respective first gripping means;

(c) inserting shafts across said pipe interior through said respective bored first holes;

(d) securing a pair of second releasable reclosable gripping means about said pipe exterior at positions respectively further upstream and downstream of said respective first gripping means;

(e) boring second holes in said pipe at said respective second gripping means;

(f) connecting said respective second holes with a bypass conduit for flow of said fluid around said pipe portion requiring repair;

(g) securing a pair of third releasable reclosable gripping means about said pipe exterior at positions respectively upstream and downstream of said repair portion, each of said third gripping means being between said respective first and second gripping means upstream and downstream of said repair portion;

(h) boring third holes in said pipe at said respective third gripping means;

(i) inserting inflatable bladder means into said pipe interior through said third holes; and (j) inflating said respective bladder means until said respective bladder means contact said respective proximate shafts and occupy the cross sectional area of said pipe thereby blocking flow of fluid through said pipe portion requiring repair and causing flow of fluid through said bypass conduit.

15. The method of claim 14 wherein said boring steps further comprise the simultaneously performed substeps of:

(a) boring said holes in said pipe at said respective releasable gripping means with a cutting means; and (b) drawing subatmospheric pressure through a passageway in said cutting means boring said holes, said passageway communicating with cutting teeth of said cutting means, whereby any fluid leaking from said pipe at the cut location as said hole is cut is drawn off through said passageway at subatmospheric pressure.

16. The method of claim 15 wherein each of said releasable gripping means includes a first conduit extending radially away from said pipe when said gripping means is positioned about said pipe; wherein said cutting means is slidably insertable through said first conduit to reach said pipe; wherein said subatmospheric pressure is drawn through a second conduit communicating with said first conduit at a position remote said pipe; wherein said passageway in said cutting means communicates with and extends from a cutting end of said cutting means axially along said cutting means a distance at least equal to length along said first conduit from said pipe to said second conduit and terminates at the lateral exterior surface of said cutting means; wherein said cutting means has a cylindrical external portion extending axially from where said passageway terminates away from said cutting end sized for complemental slip fit insertion into said first conduit; wherein said cylindrical external portion includes visual indicia thereon at a position removed from said passageway terminus; wherein said first conduit extends outwardly from said pipe beyond the position where said second conduit communicates with said first conduit a distance in excess of distance from said indicia to said cutting end; and wherein said method further comprises the steps of:

(a) withdrawing said cutting means from contact with said pipe through said first conduit at most to a position where said indicia are at an end of said first conduit remote said pipe and then closing a valve in said first conduit between said cutting end of said cutting means and said pipe thereby closing said conduit while continuing to draw said subatmospheric pressure;

wherein said withdrawing step is performed immediately after each of said boring steps and before performance of the next successive steps recited therebelow.

* * * * *